July 21, 1953     R. S. COX     2,646,290
TOWING DEVICE WITH STEERING ATTACHMENT
Filed Aug. 25, 1950     2 Sheets-Sheet 1

INVENTOR.
RODNEY S. COX
BY Hudson, Creighton,
Williams, David & Hoffmann
ATTORNEYS July 21, 1953 R. S. COX 2,646,290
TOWING DEVICE WITH STEERING ATTACHMENT
Filed Aug. 25, 1950 2 Sheets-Sheet 2
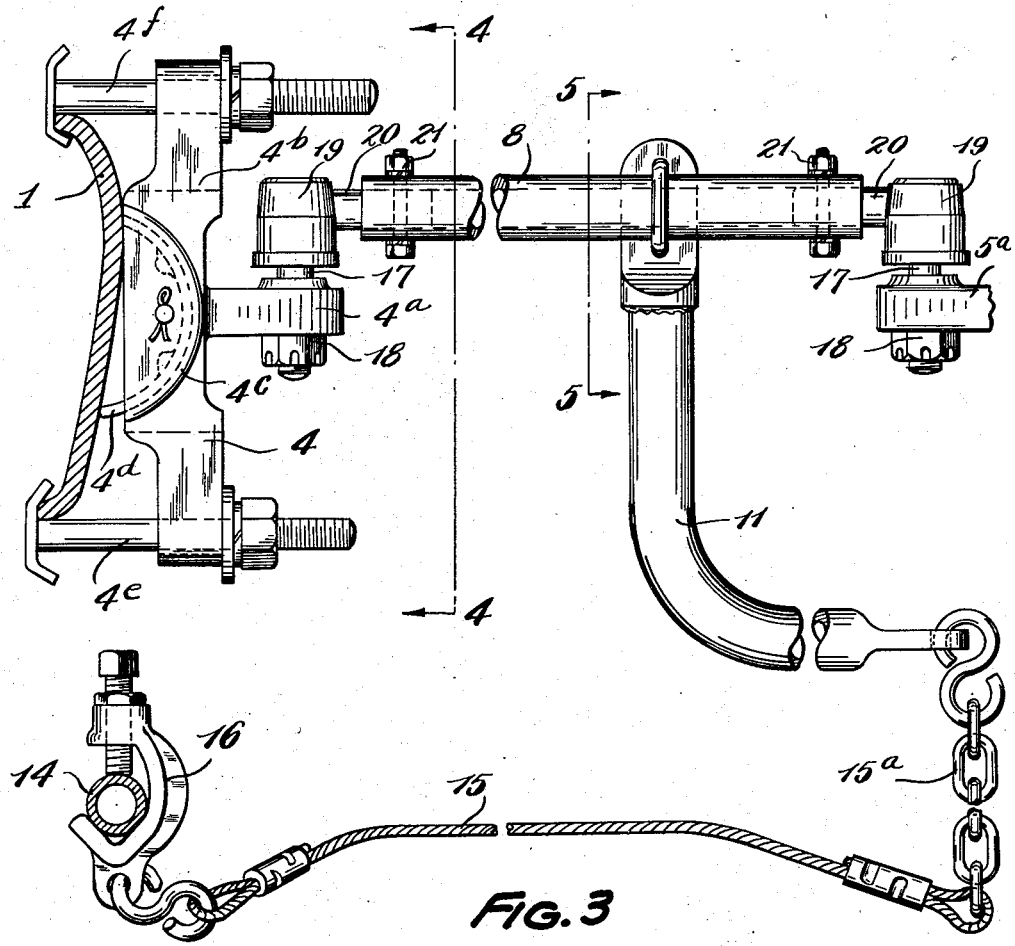
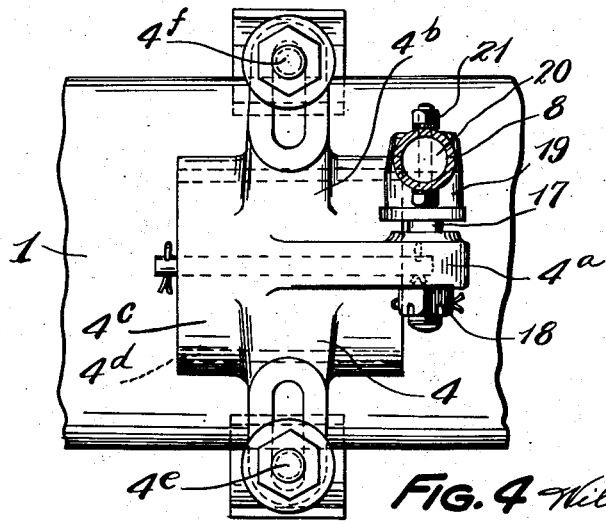
Fig. 3
Fig. 4
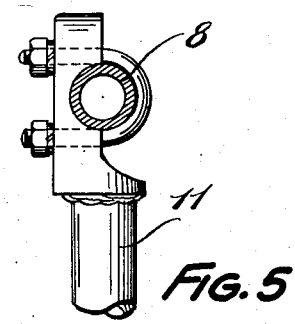
Fig. 5
INVENTOR.
RODNEY S. COX
BY Hudson, Boughton,
Williams, David & Hoffmann
ATTORNEYS Patented July 21, 1953

2,646,290

UNITED STATES PATENT OFFICE 2,646,290

TOWING DEVICE WITH STEERING ATTACHMENT

Rodney S. Cox, Marion, Ohio

Application August 25, 1950, Serial No. 181,504

8 Claims. (Cl. 280—33.55)

This invention relates to a mechanism adapted for attachment to a towed vehicle and a vehicle which is to be towed.

One object of the invention is to provide a mechanism in which the pull and thrust incident to the operation of the towing vehicle may be transmitted to the towed vehicle without any possibility of collapse of the mechanism which would occasion any bumping between the vehicles.

A further object of the invention is to provide crossed members which while pivotally connected to the towing vehicle and the towed vehicle, thus permitting flexibility of connection, nevertheless, will directly transmit a pull or thrust incident to the operation of the towing vehicle.

An additional object of the invention is to provide an adjustable bracket carried adjacent that end of each of the cross members which is adjacent to the towed vehicle, which bracket is adjustable and extends beneath the forward portion of the vehicle so that by means of cables which cross each other these brackets may be connected to the steering mechanism of the towed vehicle.

Other objects will appear as the description proceeds, and in this connection reference should be had to the accompanying drawings in which, Fig. 1 is a perspective view showing the rear portion of a towing vehicle and the forward portion of a towed vehicle together with which the mechanism of the present invention is used;

Fig. 3 is an elevation with certain portions in section showing a portion of the mechanism of the invention;

Fig. 4 is a sectional elevation upon the line 4—4 of Fig. 3; and

Fig. 5 is a section upon the line 5—5 of Fig. 3.

Figure 1:
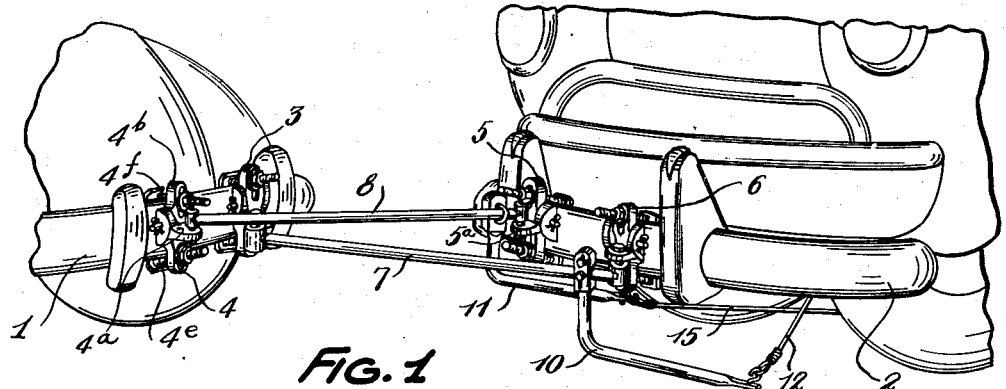

Referring to the drawings, 1 indicates a bumper which is rigidly attached to the frame or body of a towing vehicle.

The bumper of a towed vehicle which is rigidly attached to the frame or the body of a towed vehicle is indicated at 2.

Attached in spaced relation upon the bumper 1 are two brackets 3 and 4, and attached in spaced relation on the bumper 2 are two brackets 5 and 6. These brackets are all similar in construction and the detail of their construction will be referred to a little later. Each of the brackets mentioned is provided with an extending arm, which arms are shown at 3a, 4a, 5a and 6a, these arms extending at an angle with respect to the bracket and in such fashion that the arms upon the adjacent bracket extend in a general direction toward each other.

Figure 2:
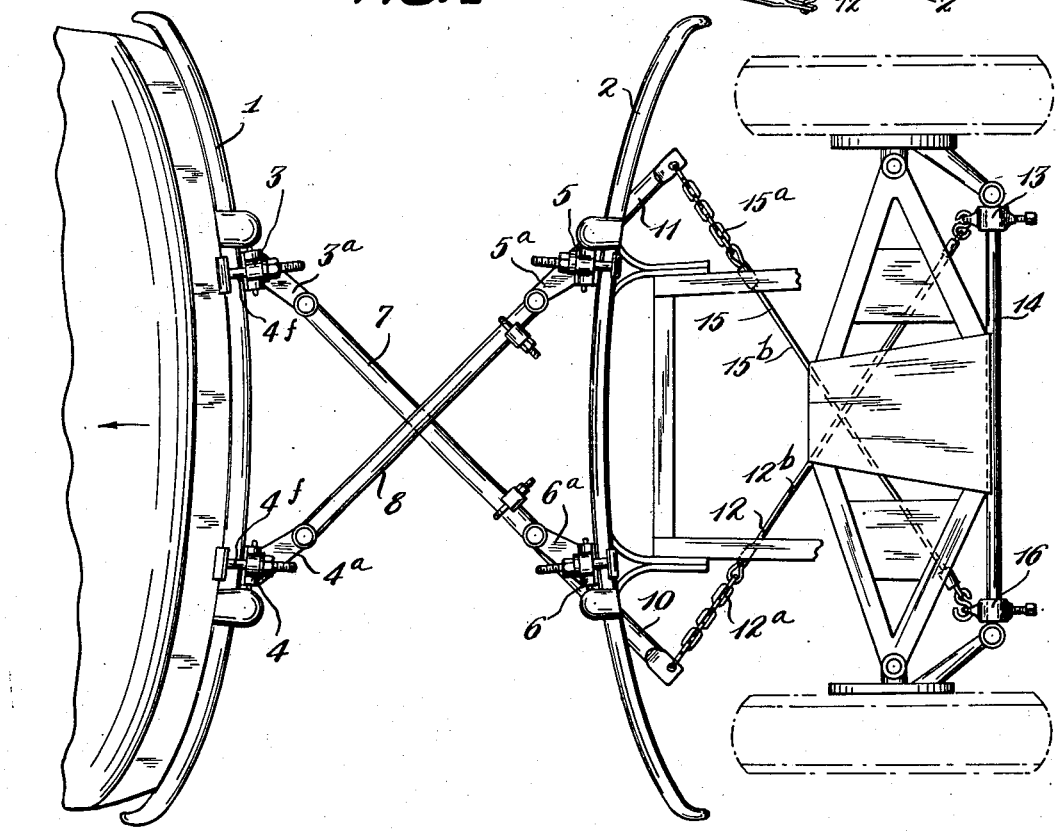
Fig. 2 is a top plan view of the towing mechanism with certain portions of the towing and towed vehicle being omitted.

Two bars are provided which are indicated at 7 and 8. These bars cross each other in the manner shown in Fig. 2 and at their ends are pivotally connected to the arms 3a, 4a, 5a and 6a, the bar 7 to the arms 3a and 6a and the bar 8 to the arms 4a and 5a.

It will be apparent from the description that has been given so far that these arms may move relative to each other, as, for instance, when the towing vehicle is steered these bars 7 and 8 will move relatively, but nevertheless so long as the towing vehicle is moving forward the pulling effect exerted upon the bars 7 and 8 will be transmitted to the towed vehicle. Likewise, if the towing vehicle is backing up the thrust incident thereto will be transmitted through the bars 7 and 8 to the towed vehicle. Thus the connection between the towing vehicle and the towed vehicle is rigid with respect to the matter of the transfer of pull or thrust, but is flexible to permit the necessary angular relationship between the towing vehicle and the towed vehicle incident to the operation of the towing vehicle.

In order to provide for the operation of the steering mechanism of the towed vehicle in conformity with the steering operation of the towing vehicle, there is provided in connection with each of the bars 7 and 8 an arm, one of which is shown in Fig. 1 by the numeral 10, this arm being rigidly attached to the bar 7, and also shown is a second arm 11 which is rigidly attached to the bar 8. Each of these arms 10 and 11 is adjustably attached to its respective bars 7 and 8 by any suitable means, for the purpose of permissible adjustment of the attaching means between the arms mentioned and the steering mechanism. Each arm extends beyond and beneath the pivoting bracket to which its respective arm is pivoted. In fact, the arm 10 may conveniently be L-shaped so that the lower part of the bracket can extend beneath the bumper and frame of the towed vehicle, thereby to more readily permit the attachment of flexible cables to the steering mechanism of the towed car, as will presently be explained.

It will be noted that any angular movement of the bars 7 and 8 will be imparted to the respective arms 10 and 11, but it will also be noted that the arms 10 and 11 do not partake of any thrust action communicated through the bars 7 and 8 which may be occasioned by the driving or stopping of the towing car.

Attached to the end of the arm 10 is a flexible member 12, which flexible member at its opposite end is articulated to a fastener 13 which is secured upon the cross rod 14 of the steering mechanism of the towed car and is positioned essentially at one end of this cross rod 14.

Attached to the end of the arm 11 is the flexible member 15 which at its opposite end is articulated to a fastener 16 which is secured upon the cross rod 14 at the end thereof opposite that to which the fastener 13 is attached. These flexible members 12 and 15 as shown comprise portions which are chains as, for instance, 15a and 12a and cable portions which are indicated 15b and 12b.

The arms 10 and 11 being adjustable upon their respective rods 7 and 8 may be positioned to best coordinate the action of the flexible members 15 and 12 with respect to their accomplishing the movement in the proper direction of the wheels of the towed vehicle incident to steering of the towing vehicle.

Referring to Fig. 3 of the drawing, there is shown in more detail the construction and articulation of a bar with respect to its bracket and also the connection of the arm carried by the bar with the flexible member.

It may be assumed that in Fig. 3 the bracket which is there shown is the bracket 4, each bracket consisting of a body portion 4b which is provided with a re-entrant chamber 4c, which chamber has a symmetrically curved surface. Associated with this is a member 4d which has a rounded surface complementary to the surface of the portion 4c so that the parts mentioned can move with respect to each other.

The purpose of the construction which has been described is so that the bracket 4 may be attached to a bumper or any other similar fixed portion of a vehicle in such fashion that the body thereof is essentially vertical and not at an angular relation. What has been said pertains also to all of the other brackets and under such circumstances the bars 7 and 8 will operate in essentially horizontal planes and any transmission of pull or thrust will be in such a plane.

The part of the bracket which is indicated at 4c engages with the surface of the bumper, for instance 1, and assumes an angular position with respect to the body portion 4a of the bracket. The clamping bolts 4e and 4f can therefore be so tightened up as to position the body of the bracket in essentially a vertical position.

If the surface of the bumper (or other rigidly connected member of the vehicle) is flat and essentially vertical, the member 4d will not assume the rocked position shown in Fig. 3 and again in such a situation above indicated, the part 4d may be dispensed with.

As before described, the bracket 4 has an arm or extension 4a. This arm carries an upstanding spindle or post 17 which is secured in the arm 4a by the nut 18. Associated with the spindle 17 so as to rotate thereon is the member 19 which has an extending portion 20 that is attached to the bar 8.

In the instance shown, the bar 8 is tubular and therefore the portion 20 extends within the bar 8 and is secured thereto by the bolt and nut structure indicated at 21. The articulation of the opposite end of the bar 8 with respect to the arm 5a of the bracket 5 is in kind the same as that which has just been described with respect to the parts associated with the arm 4a.

The connections between each of the arms 3a and 6a of the brackets 3 and 6 is the same as that which has been described with respect to the arms 4a and 5a except that the parts 17 and 19 respectively extend downwardly from the respective arms 3a and 6a so that the bar 7 will extend below the bar 8.

From the foregoing description it will be seen that the bars 7 and 8 are articulated to the brackets 3, 6, 4 and 5 so as to have full pivotal connection with their respective brackets and permissible relative movement between the bars 7 and 8 without interference.

Furthermore, the two towbars when attached to the towing vehicle and the vehicle to be towed assume what may be called an X configuration and establish rigid connections between the two vehicles so that there can be no collapsing of the towing mechanism that might result in two cars bumping each other.

Moreover, due to the X configuration of the connecting bars 7 and 8, the steering operation may be effected by the use of the extending arms which are adjustably carried by the bars 7 and 8 and the use of flexible connections, also in X configuration, attached to the steering mechanism of the towed vehicle.

The whole arrangement spells simplicity and rugged, flexible connections which, however, are rigid so far as transmission of thrust or pull incident to operation of the towing car is concerned.

In the drawing the brackets which are attached to the bumper of the towing car are spaced approximately the same as the brackets in the bumper of the towed car. This is not essential, for the brackets that are mounted on one of the bumpers may be spaced apart a distance greater or less then the brackets on the opposite bumper.

The foregoing is of advantage in that it makes possible the avoidance of bumper brackets and the grillwork usually associated with an automobile, which in many instances would not be possible if the brackets of the tow bar were of necessity to be mounted a fixed distance apart.

It will be obvious that the precise instrumentalities used to effect the arrangement of parts and their mountings may be varied without departing from the spirit of the invention.

Having thus described my invention, I claim:

1. A vehicle towing mechanism comprising a pair of crossed bars, a vehicle attaching bracket pivotally attached at each end of each bar, an arm rigidly carried by each bar adjacent one end of each bar, each arm forming an extension of the bar to which it is attached, a pair of flexible members, one end of each of said members attached to an arm and the other end of each flexible member having means for attachment to the steering mechanism of a vehicle.

2. A vehicle towing mechanism comprising a pair of crossed bars, a vehicle attaching bracket pivotally attached to each of the bars at opposite ends thereof, an arm rigidly carried by each bar adjacent one end of each bar and extending beyond the end of the bar by which it is carried, a first flexible member having one end attached to one of said arms, a second flexible member having one end attached to the other of the said arms, each of the flexible members being provided with means for attachment to the steering mechanism of a vehicle.

3. A vehicle towing mechanism comprising a pair of bars, brackets pivotally attached at each end of each bar, each bracket having a movble positioning part, an L-shaped arm rigidly carried by each bar adjacent one end of each bar, a portion of each arm extending beyond the end of the bar by which it is carried, a pair of flexible members, one end of each of said members being attached to an arm, the other end of each flexible member having means for attachment to the steering mechainsm of a vehicle.

4. A vehicle towing mechanism comprising a pair of crossed bars, a bracket for vehicle attachment pivotally attached at each end of each bar, an arm rigidly carried by each bar adjacent one end of each bar, each arm extending beyond the end of the bar to which it is attached, said arm being adjustable with respect to the bar on which it is to be mounted, a pair of flexible members, one end of each of said members attached to an arm, the other end of each flexible member having means for attachment to the steering mechanism of a vehicle.

5. A vehicle towing mechanism adapted to cooperate with a towing vehicle and a towed vehicle comprising a pair of bars arranged to cross each other, means for pivotally attaching one end of each bar to the towing vehicle and the other end of each of the bars to the towed vehicle, an arm rigidly carried by each bar adjacent the end of said bar which is pivotally connected to the towed vehicle, a pair of flexible members, one end of each of said members attached to an arm, the other end of each flexible member having means for attachment to the steering mechanism of a vehicle.

6. A vehicle towing mechanism adapted to cooperate with a towing vehicle and a towed vehicle, in which each vehicle has a transversely extending member rigid with the vehicle, a pair of spaced brackets intended for attachment to each said transversely extending member, a pair of bars arranged to cross each other, the opposite ends of said bars each being pivotally attached to a bracket, an arm rigidly carried by each bar adjacent the end thereof each arm being adjustable with respect to the bar upon which it is mounted, which is connected with the brackets to be attached to the towed vehicle, a pair of flexible members, one end of each of said members attached to an arm, the other end of each flexible member having means for attachment to the steering mechanism of a towed vehicle.

7. A vehicle towing mechanism comprising a pair of crossed bars, a vehicle attaching bracket pivotally attached at each end of each bar, each said bracket comprising two parts with complementary engaging rounded surfaces, thereby to permit relative movement between the parts of the bracket, an arm rigidly carried by each bar adjacent one end of each bar, a pair of flexible members one end of each of said flexible members attached to an arm and the other end of each flexible member having means for attachment to the steering mechanism of a towed vehicle.

8. A vehicle towing mechanism adapted to cooperate with a towing vehicle and a towed vehicle in which each vehicle has a transversely extending member rigid with the vehicle, a pair of spaced brackets adapted for attachment to each said transversely extending member, each of said brackets comprising a body having a recessed rounded surface and a part complementarily shaped to engage said surface, the said last mentioned part being intended for engagement with a transversely extending member of the vehicle, means associated with the first mentioned part of the bracket for attachment to the transversely extending member of the vehicle whereby the body portion of the clamp may be arranged in essentially vertical position, a pair of bars arranged to cross each other, the opposite ends of said bars each being pivotally attached to one of the brackets, an arm rigidly carried by each bar adjacent the end thereof which is connected with the brackets intended for attachment to the towed vehicle each arm being adjustable with respect to the bar upon which it is mounted, a pair of flexible members, one end of each of said members attached to an arm, the other end of each flexible member having means for attachment to the steering mechanism of the towed vehicle.

RODNEY S. COX.

References Cited in the file of this patent

UNITED STATES PATENTS

| Number | Name | Date |
|---|---|---|
| 1,331,854 | Sloan | Feb. 24, 1920 |
| 1,342,079 | Yoder | June 1, 1920 |
| 2,035,669 | Pribil | Mar. 31, 1936 |
| 2,078,756 | Harris | Apr. 27, 1937 |
| 2,206,991 | Williams et al. | July 9, 1940 |
| 2,506,109 | Reimann et al. | May 2, 1950 |